Sept. 11, 1923.
H. E. MOORE ET AL
SHOCK ABSORBER
Filed June 29, 1921 2 Sheets-Sheet 1
1,467,945
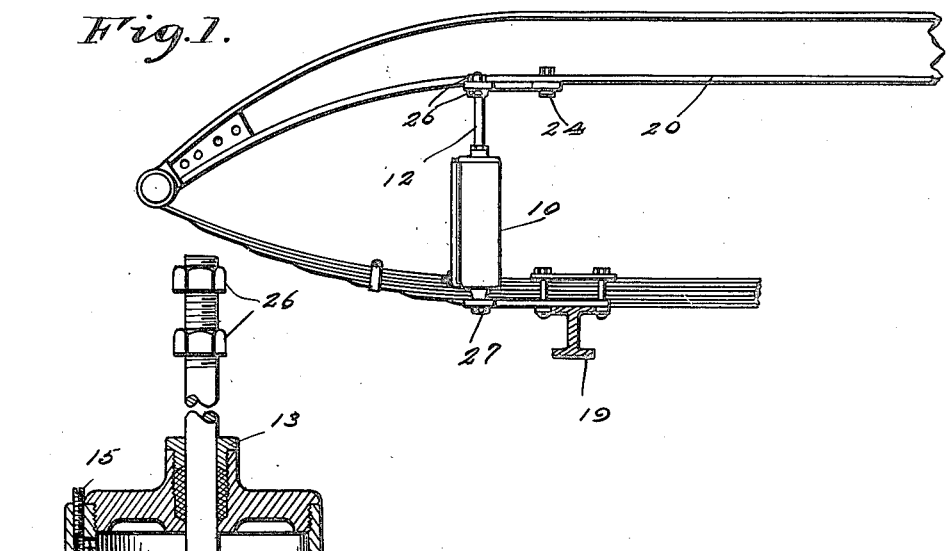
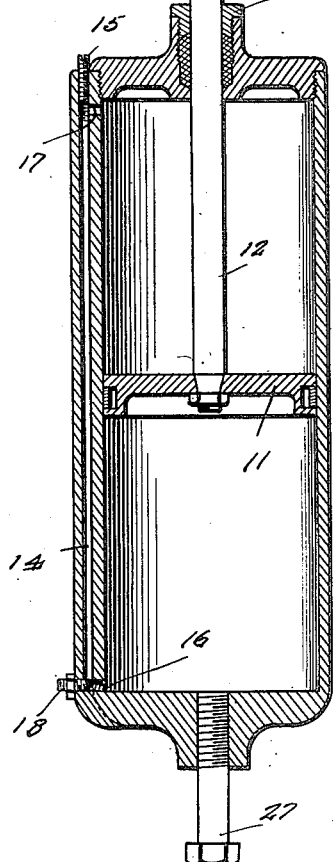
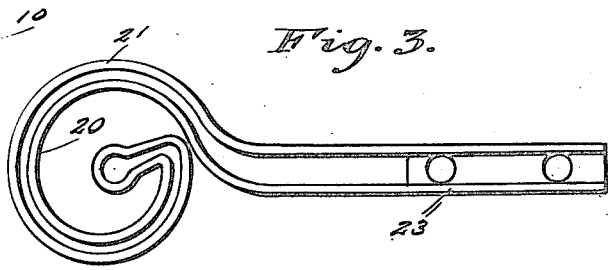
B. F. Moore
H. E. Moore
INVENTOR Sept. 11, 1923.    H. E. MOORE ET AL    1,467,945
SHOCK ABSORBER
Filed June 29, 1921    2 Sheets-Sheet 2
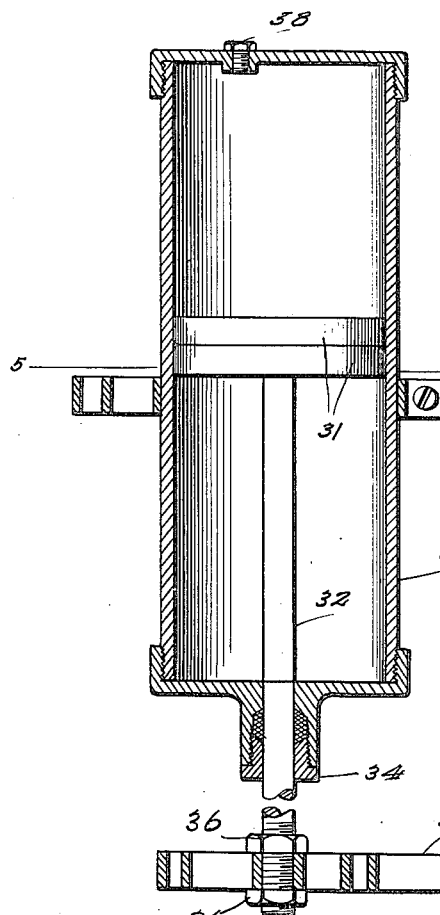
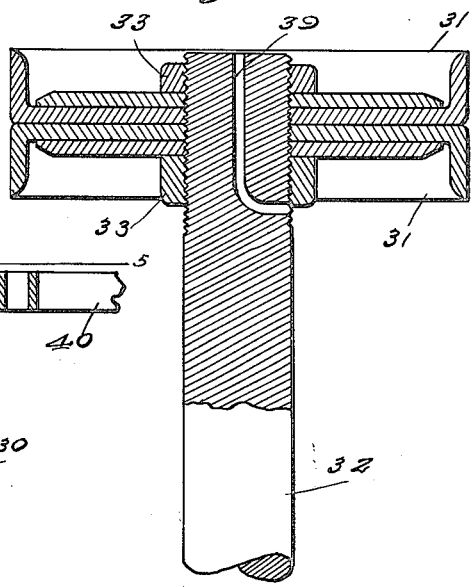
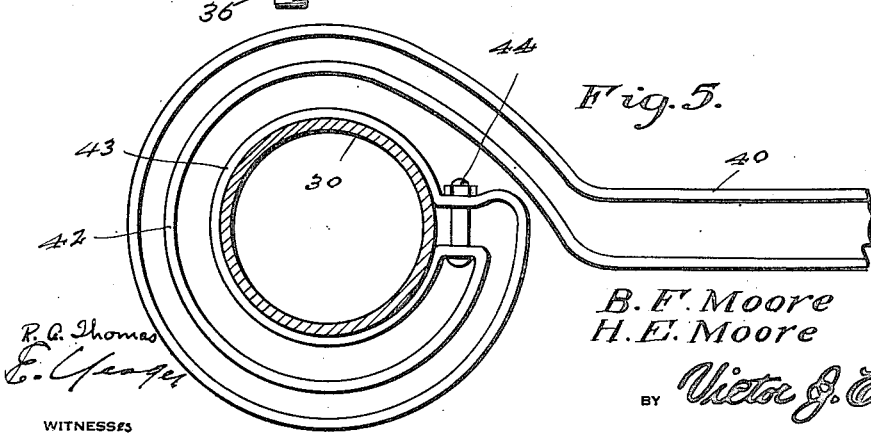

Patented Sept. 11, 1923.

1,467,945

UNITED STATES PATENT OFFICE.

HENRY E. MOORE AND BENJAMIN F. MOORE, OF VANCE, WASHINGTON.

SHOCK ABSORBER.

Application filed June 29, 1921. Serial No. 481,399.

*To all whom it may concern:*

Be it known that we, HENRY E. MOORE and BENJAMIN F. MOORE, citizens of the United States, residing at Vance, in the county of Lewis and State of Washington, have invented new and useful Improvements in Shock Absorbers, of which the following is a specification.

This invention relates to shock absorbers for vehicles, and embodies amongst other features a cylinder interposed between the axle and frame of the vehicle, and within which operates a piston, one of these parts being connected with the frame of the vehicle and the other connected with the axle so as to provide a cushioning means to absorb the shock and jars incident to the travel of the vehicle over irregular surfaces.

One of the chief characteristics of the invention resides in the provision of means for associating the piston and its cylinder in a manner to permit the shock absorber in its entirety to rock in any direction and thus adjust itself to the swinging or swaying movement of the car, thereby always occupying a position for use for the purpose intended.

The nature and advantages of the invention will be better understood when read in connection with the accompanying drawings, the invention residing in the combination, construction and arrangement of parts as claimed.

In the drawings forming part of this application, like numerals of reference indicate similar parts in the several views and wherein:

Figure 1 is a fragmentary view of a vehicle showing the application of the invention.

Figure 2 is a view in elevation of the shock absorber, showing the cylinder and piston in section.

Figure 3 is a plan view of one of the supporting elements for the shock absorber.

Figure 4 is a view similar to Figure 2 of a modified construction.

Figure 5 is a transverse sectional view taken on line 5—5 of Figure 4.

Figure 6 is an enlarged detail sectional view of the piston and piston rod shown in Figure 4.

Referring to the drawings in detail, and particularly Figures 1 to 3 inclusive, 10 indicates a cylinder which is closed at both ends as shown, a piston 11 being arranged to reciprocate within the cylinder and supported by a piston rod 12 which operates through a packing nut 13 at one end of the cylinder. The cylinder is provided with a longitudinal bore 14 which is closed at its upper end by means of a screw plug 15, the bore communicating with the cylinder at points adjacent both ends through holes 16 and 17 respectively. A threaded adjusting element 18 intersects the bore and is adjustable to control the admittance of air from the cylinder and the bore through the bolt 16 for a purpose to be hereinafter described. There are four of these devices associated with the vehicle, one adjacent each wheel and interposed between the axle 19 and the frame 20 of the vehicle. The cylinder 10 is adapted to be secured to the axle in any suitable manner, while the piston rod 12 is adapted to be secured to the frame of the vehicle in any suitable manner, so that the cylinder and piston move relatively to absorb the shock and jars incident to the travel of the vehicle over rough surfaces, and in this respect the jar is not transmitted to the body of the vehicle. The relative positions of the cylinder and pistons may be reversed, that is, the cylinder may be secured to the frame of the vehicle, and the pistons to the axles thereof. In practice, when the piston 11 is moved downwardly in the cylinder 10 it is cushioned by the air beneath the cylinder thereby absorbing the shock and jar incident to the upward movement of the running gear of the vehicle, and during this movement, of the piston the air escapes from the cylinder 10 through the port 16 into the bore 15, entering the cylinder above the piston through the port 17. Upon movement of the piston in an upward direction incident to the rebound of the vehicle springs, the piston is cushioned by the air admitted to the cylinder above the piston just described, thereby preventing the shock and jar from being transmitted to the body of the vehicle. During this movement of the piston the air is forced from the upper part of the cylinder through the port 17 and bore 14 into the lower part of the cylinder as will be readily understood.

While as above stated, the cylinder 10 and the piston rod 12 may be associated with the axle and frame of the vehicle in any suitable manner, we preferably make use of a resilient supporting element such as illustrated in Figure 3. As the supporting element for both the piston rod and cylinder are the same, a detail description of one will suffice for both. Each element is formed from a single length of suitable material to define what we term a tubular coil. The inner and outer convolutions 20 and 21 respectively of this coil are spaced, and terminate to provide spaced parallel portions 23 which are utilized to secure the supporting element to its respective part of the vehicle, through the instrumentality of bolts or other suitable fastening elements 24. The closed end of the coil is disposed centrally of the latter and shaped to embrace the piston rod 12 being held associated therewith by means of nuts 26 arranged upon the piston rod above and below the coil as illustrated. For the purpose of associating the supporting member with the cylinder 10, the latter is equipped with a headed bolt 27 which projects centrally from the bottom of the cylinder and is embraced by the closed end of the coil in the same manner as the piston rod 12, the piston rod and cylinder being connected by the supporting element in the direct line of thrust. The construction and arrangement of yieldable supporting elements is such that the shock absorbers are susceptible of adjustment in any direction so that they may assume proper positions for use irrespective of the direction in which the body of the car sways.

A small quantity of oil may be arranged in the cylinder 10 and pumped through the bore 14, passing around the piston during the operation of the device thereby keeping the walls of the cylinder properly lubricated at all times.

In Figures 3 to 6 inclusive, we have illustrated a modified form of the invention wherein the cylinder is indicated at 30, and closed at both ends as illustrated. The piston in this instance is composed of reversely disposed leather cushions 31 which are held associated with the piston rod 32 by suitable nuts 33. The piston rod operates through a packing nut 34 at one end of the cylinder and is associated with one of the yieldable supporting elements 35 hereinabove described, the connection between the supporting element and piston rod being indicated at 36. The opposite end of the cylinder being provided with openings so that lubricant may be introduced to the cylinder, the opening being closed by a plug 38. The piston rod is provided with a by-pass 39 to permit of air passing from one end of the cylinder to the other at opposite sides of the piston during the operation of the device, this by-passing opening at one end of the piston rod, and at one side thereof adjacent the lowermost nut 33. Manifestly, when the piston is moved upwardly in the cylinder it is cushioned by the air contained therein, the air escaping through the by-pass 39 into the lower portion of the cylinder at the opposite side of the piston, so as to provide a cushion with the return movement of the piston incident to the rebound of the vehicle springs, when the running gear has been subjected to shocks and jars. By adjusting the lowermost nut 33 on the piston rod, the adjacent end of the by-pass may be more or less opened or closed as found most desirable to the proper functioning of the device.

In this form of the invention the resilient supporting element for the cylinder indicated at 40 is substantially the same in construction as above described, being formed from a single length of suitable material to provide what we term double wall. The only distinction between this supporting member and the one above described is that the innermost convolutions 42 of the coil is extended to provide a split annulus 43 which is adapted to embrace the cylinder in a manner shown, the annulus being contracted or expanded by means of an adjustable connecting element 44.

While it is believed that from the foregoing description the nature and advantages of the invention will be readily apparent, we desire to have it understood that we do not limit ourselves to what is herein shown and described, and that such changes may be resorted to when desired as fall within the scope of what is claimed.

What we claim is:

A shock absorber for vehicles comprising a cylinder arranged between the vehicle frame and adjacent axle, a piston arranged to reciprocate therein, a piston rod, means for conveying air from one side of the piston to the other as the piston is reciprocated, resilient elements secured to the frame and axle, and said elements having coiled portions associated with the said cylinder and piston rod for supporting the shock absorber for rocking movement for the purpose specified.

In testimony whereof we affix our signatures.

HENRY E. MOORE.
BENJAMIN F. MOORE.